United States Patent [19]

Malak

[11] Patent Number: 4,518,855
[45] Date of Patent: May 21, 1985

[54] METHOD AND APPARATUS FOR STATICALLY ALIGNING SHAFTS AND MONITORING SHAFT ALIGNMENT

[75] Inventor: Stephen P. Malak, Milwaukee, Wis.

[73] Assignee: Spring-Mornne, Inc., Milwaukee, Wis.

[21] Appl. No.: 430,333

[22] Filed: Sep. 30, 1982

[51] Int. Cl.³ .............................................. G01J 1/20
[52] U.S. Cl. .................................. 250/201; 356/152; 356/400
[58] Field of Search ................ 250/201, 203; 356/152, 356/399, 400

[56] References Cited

U.S. PATENT DOCUMENTS

| | | | |
|---|---|---|---|
| 2,692,527 | 10/1954 | Wetzel | 356/152 |
| 2,703,505 | 3/1955 | Senn | 356/400 |
| 3,551,057 | 12/1970 | Hamilton et al. | 356/400 |
| 3,723,013 | 3/1973 | Stirland et al. | 250/204 |
| 3,816,000 | 6/1974 | Fiedler | 356/400 |
| 3,901,604 | 8/1975 | Butler | 356/152 |

OTHER PUBLICATIONS

Gen. Int'l Conference on Experimental Stress Analysis, Munich Ger. 9/18-22/1978, "Electro Optical System for Measuring Dynamic Response of Tower Structures", pp. 367-372.

Primary Examiner—David C. Nelms
Assistant Examiner—J. Gatto
Attorney, Agent, or Firm—Stephen P. Malak

[57] ABSTRACT

A method and apparatus for statically aligning, checking or monitoring the alignment of a first shaft with a second shaft, one shaft being preferably chosen as a reference shaft to which the other shaft is aligned, the apparatus comprising a first mount means mounted on the first shaft and having mounted thereon a first dual-axis radiation sensing means and means for providing a first radiation beam, a second mount means mounted on the second shaft and having mounted thereon a second dual-axis radiation sensing means and means for providing a second radiation beam, the first radiation beam oriented to impinge upon the second dual-axis radiation sensing means to generate a second signal, the second radiation beam oriented to impinge upon the first dual-axis radiation sensing means to generate a first signal, and readout means having defined alignment conditions responsive to the first signal and the second signal for visually displaying shaft alignment, with alignment of the two shafts indicated by the first signal and the second signal coinciding with the defined alignment conditions.

45 Claims, 14 Drawing Figures

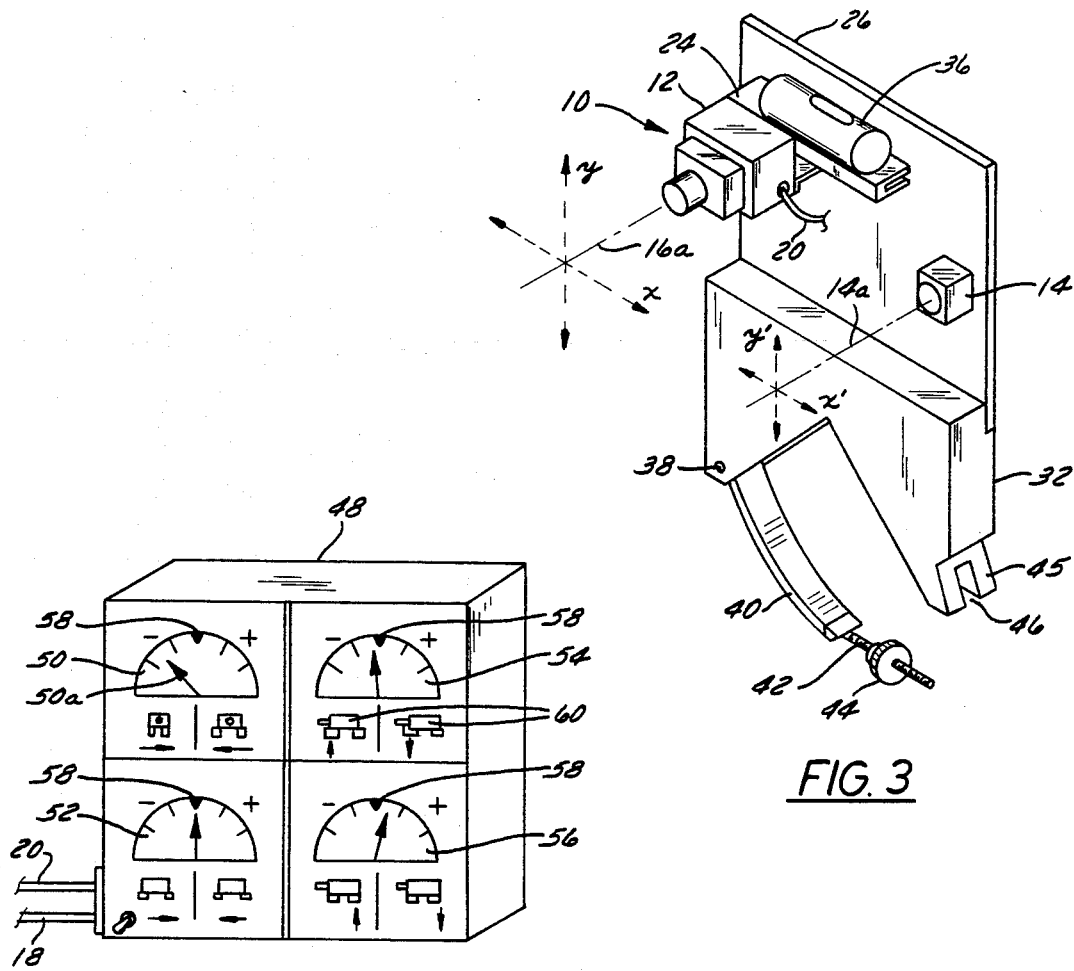
FIG. 3
FIG. 4
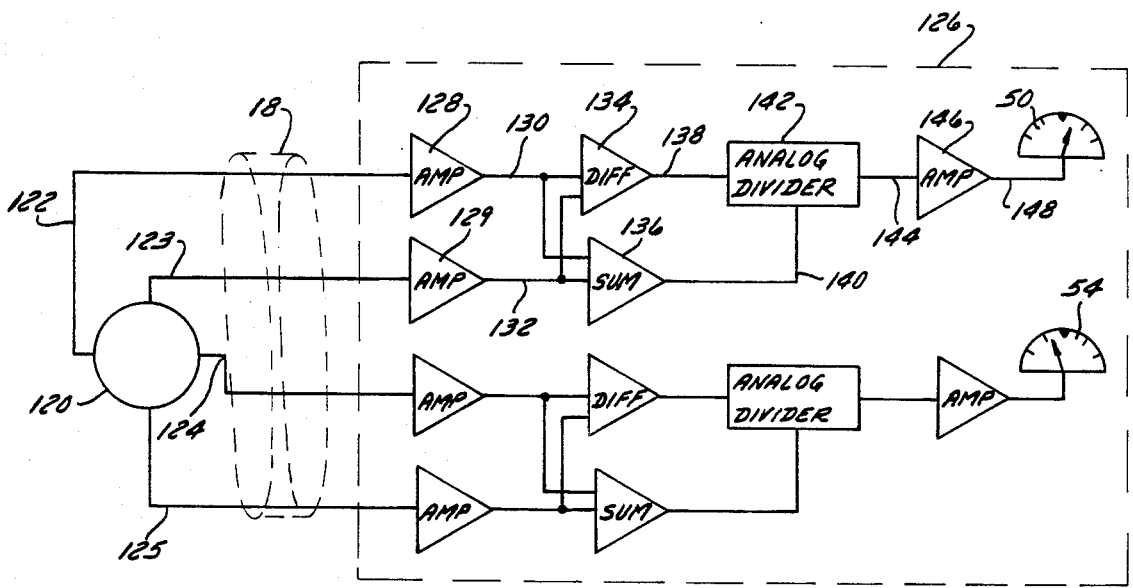
FIG. 5

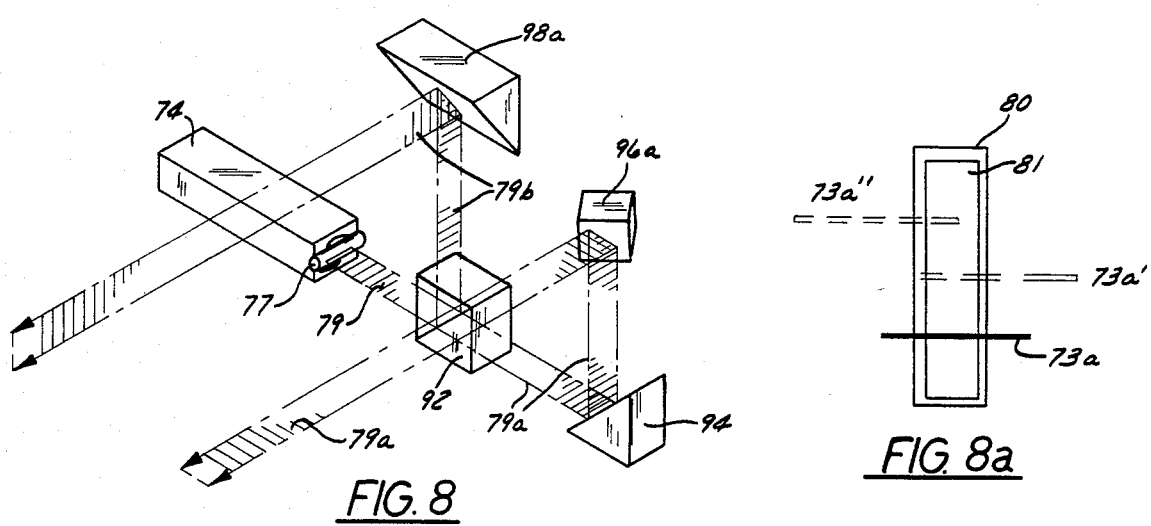
FIG. 8
FIG. 8a
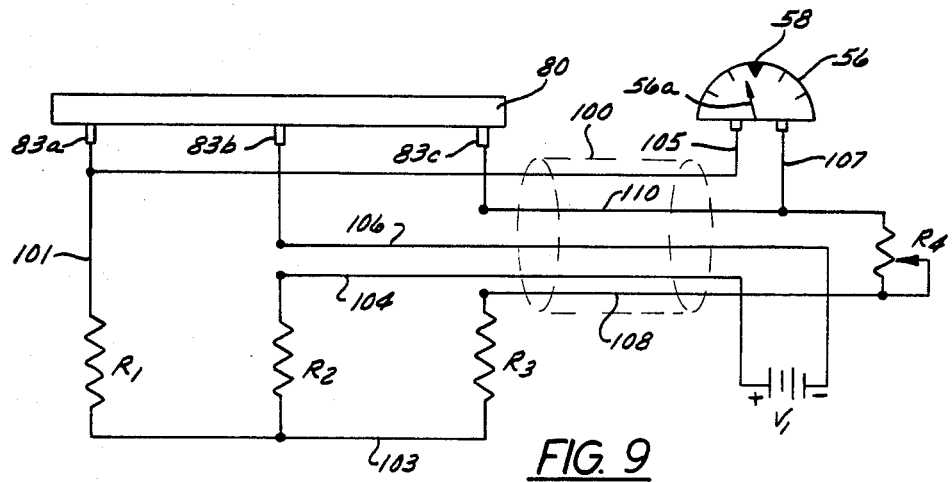
FIG. 9
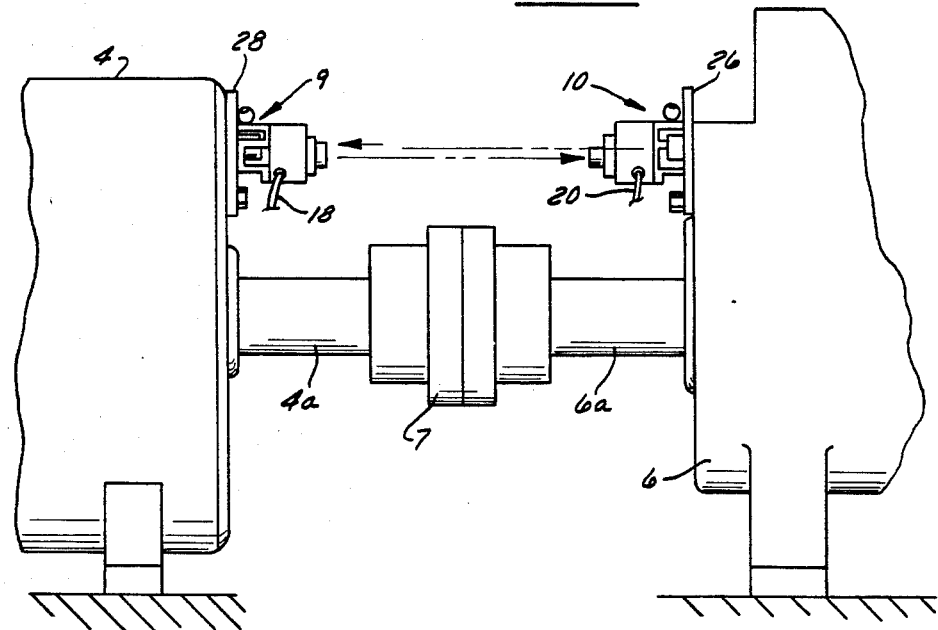
FIG. 10

METHOD AND APPARATUS FOR STATICALLY ALIGNING SHAFTS AND MONITORING SHAFT ALIGNMENT

FIELD OF THE INVENTION

The present invention relates to alignment devices directed to aligning two shafts which can be connected by a coupling and, in particular, to static alignment devices which do not require shafts to be rotated to achieve alignment position readings.

DESCRIPTION OF THE PRIOR ART

Non-rotating or static alignment devices have been disclosed in U.S. Pat. Nos. 4,115,925; 4,161,068 and 3,192,631. U.S. Pat. No. 4,115,925 provides three dimensional alignment detection by the use of two universal joints with appropriately mounted position sensors. The joints communicate through the use of a telescoping connection mounted on one yoke of each universal joint. The position sensors provide signals to a read-out controller which can indicate both angular and parallel misalignment conditions. This device is limited in accuracy by the requirement of a precision machined telescoping connection, which mechanical connection the present invention does not require. In addition, the universal yokes, which translate the positions of the shafts into useable rectangular coordinate information, must be made a minimum size to accommodate mounting the position sensors. This is a problem since it places a limit on the minimum mounting distance between the universal yokes as they sit on their respective shafts. The present invention not using such universal joints accordingly permits substantially reducing the minimum shaft-to-shaft mounting distance. U.S. Pat. No. 4,161,068 provides misalignment information by using mechanical target rods with micrometers in conjunction with two cooperating Moire fringe pattern surfaces to detect angular misalignment. The present invention does not use mechanical target rods which can deflect. In addition, the Moire fringe pattern surfaces must lie flat against each other for operation and this is difficult to achieve. Furthermore, the Moire pattern generated is difficult to interpret in terms of magnitude and direction of misalignment. U.S. Pat. No. 3,192,631 uses telescope elements having cross-hair graticules and cross-hair target screens. These particular elements can provide an indication of the direction of misalignment, but they cannot provide an indication of the magnitude of misaligned conditions and the shafts must be adjusted by trial and error until the aligned conditions are met by visually looking through the telescopes. The present invention eliminates this trial and error by providing immediate electronic signals representing simultaneously the magnitude and direction of misalignment.

SUMMARY OF THE INVENTION

It is, therefore, a general object of this invention to provide a simple method and apparatus to statically align two shafts, in three dimensions, with simultaneous detection of the magnitude and direction of misaligned conditions and a displayed indication of the movements and adjustments necessary to bring the two shafts into alignment.

In general, the present invention comprises a shaft alignment or monitoring sensing structure having a support, a dual-axis radiation sensing means mounted on the support to provide a radiation beam. The static shaft alignment apparatus when used for aligning or checking the alignment of two shafts to be coupled, utilizes two of the shaft alignment sensing structures each mounted, respectively, on a shaft mount means which locks each sensing structure, respectively, one each to a shaft in facing relation. The sensing structures can have phase orientation means to orient each shaft mount means so that the radiation beams carried by the respective sensing structures impinge upon the opposite facing dual-axis radiation sensing means. Each radiation sensing means responds to the radiation beam coming from the opposite sensing structure and generates a signal which is sent to a readout having defined alignment conditions. The signals from the two radiation sensing means jointly provide information, in one form being rectangular or angular coordinate information, representing the magnitude and direction of misalignment as compared to the defined alignment conditions and accordingly replicate the axial misalignment positions of the two shafts.

In particular, the shaft alignment apparatus for statically aligning a first shaft with a second shaft comprises a first mount means mounted on the first shaft, the first mount means having mounted thereon a first dual-axis radiation sensing means and a first radiation source, and a second mount means mounted on the second shaft, the second mount means having mounted thereon a second dual-axis radiation sensing means and a second radiation source. The first radiation source is oriented to provide a first radiation beam to the second dual-axis radiation source means to generate a second signal and the second radiation source is oriented to provide a second radiation beam to the first dual-axis radiation sensing means to generate a first signal. A readout means having defined alignment conditions is responsive to the first signal and the second signal for visually displaying shaft alignment, with alignment of the two shafts indicated by the first signal and second signal coinciding with the defined alignment conditions. The readout compares the first and second signals to the defined alignment conditions, and any deviation of the first and second signals from the defined alignment conditions, which are calibrated conditions, is displayed as misalignment information in both magnitude and direction. With one shaft chosen as the axial reference, the other shaft is adjusted into alignment with the reference shaft according to the displayed misalignment information.

An additional object of this invention is to provide a shaft alignment apparatus which can avoid substantial parallel offset misalignment of the two shafts by incorporating the use of phase orientation means mounted on the first mount and second mount so as to accurately orient each mount to replicate calibrated conditions.

A further object of this invention is to provide a shaft aligning apparatus which can align two shafts which can be axially coupled without having to rotate either shaft to obtain misalignment information.

An additional object of this invention is to provide a method and apparatus for shaft alignment that can be quickly and easily mounted and dismounted on the shafts.

A still further object of this invention is to provide a method and apparatus to quickly check the alignment of two shafts connected by a coupling without having to disconnect the coupling.

A further object of this invention is to provide a shaft alignment sensing structure that can be used to constantly monitor the alignment condition of two shafts coupled together.

Another object of this invention is to provide a method and apparatus which reduces trial and error required by prior art devices, and eliminates any mechanical connectors between the opposite facing sensing structures mounted on the shafts.

BRIEF DESCRIPTION OF THE DRAWINGS

With reference to the above objects of the invention and other objects and advantages which will appear in the following description taken in connection with the accompanying drawings:

FIG. 3 is a perspective view of one of the shaft mount means showing mounted thereon a shaft alignment dual-axis sensing structure;

FIG. 4 is a perspective view of one form of readout means displaying the misalignment information;

FIG. 5 is a block diagram of one form of an electrical circuit for operation with one of the radiation detectors;

FIG. 8 is a perspective view of a first variation of splitter beam means controlling the projection of the alignment radiation beam;

FIG. 8a is a front view of one of the position radiation detectors having impinged upon it one of the projected alignment radiation beams of FIG. 8;

FIG. 9 is one form of an electrical circuit for operation with one of the radiation detectors of FIG. 7a, 7b or 8a; and FIG. 10 is a side view showing shaft alignment sensing structures mounted for monitoring changes in alignment of operating equipment.

DESCRIPTION OF THE PREFERRED EMBODIMENT

Figure 2:
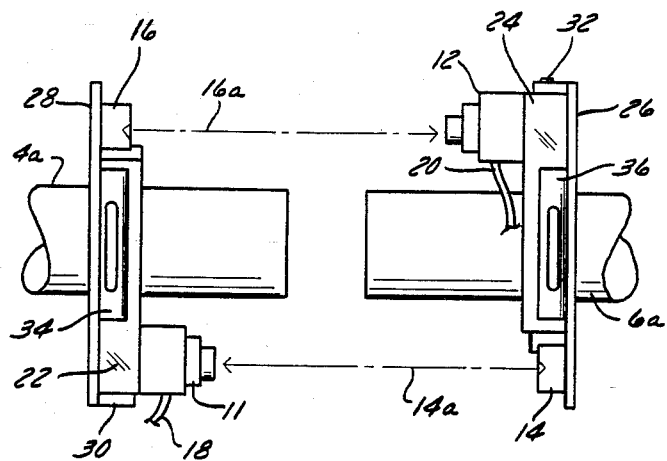
FIG. 2 is a top view of the shaft alignment apparatus shown mounted on the two shafts.
Figure 1:
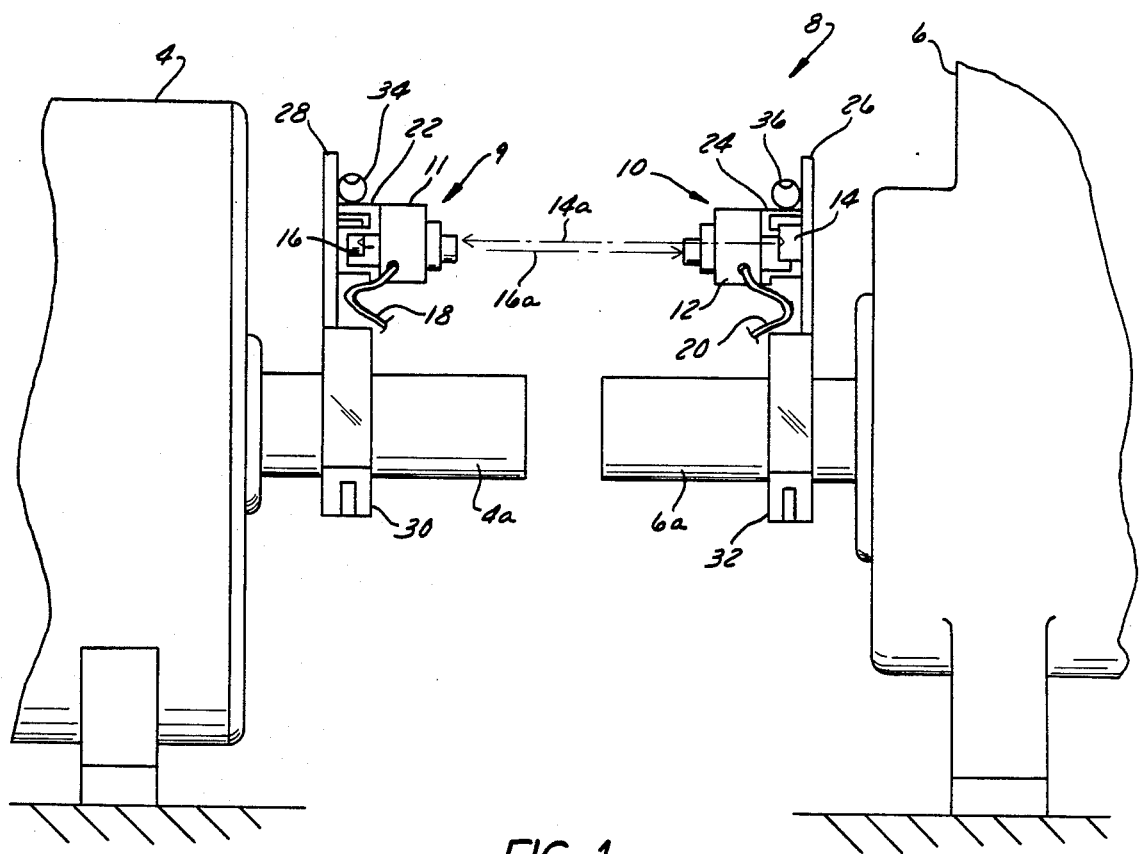
FIG. 1 is a side view of the shaft alignment apparatus shown mounted on the two shafts.

Referring in particular to the drawings, and initially with respect to FIGS. 1, 2 and 3, FIG. 1 shows the present invention generally indicated at 8 as comprising two sensing structures located at 9 and 10. Alignment sensing structures 9 and 10 are mounted on supports 28 and 26, respectively. The shaft alignment apparatus of the present invention comprises sensing structures 9 and 10 fixed to first mount means 30 and second mount means 32, respectively. First mount means 30 and second mount means 32 (best shown in FIG. 3) are seated on first shaft 4a of driving unit 4 and second shaft 6a of driven unit 6, respectively. Both mount means can in one configuration be in the form of a V-block. The mount means 32 carries a pin 38 to which is attached a strap 40 terminating in threaded rod 42 having a thumb screw 44. Mount means 32 is secured to shaft 6a by bringing strap 40 under shaft 6a and inserting threaded rod 42 into slot 46. Thumb screw 44 is adjusted until it tightly engages surface 45. Mount means 30 can have a similar strap and slot arrangement to secure it to shaft 4a. In this manner both mount means can be quickly mounted and dismounted from their respective shafts.

Referring back to FIGS. 1 and 2, sensing structure 9 comprises a first dual-axis radiation sensing means 11 having a first signal output lead 18 and a first alignment radiation source 16. The radiation sensing means 11 is mounted on fixture 22 which is secured to support 28. The fixture 22 can also accommodate mounting thereon a first phase orientation means 34 which in one form can be a spirit level. Other forms can be electronic levels and electronic vertical position sensors. Similarly, as best shown in FIG. 3, sensing structure 10 comprises a second dual-axis radiation sensing detector 12 having a second signal output lead 20 and a second alignment radiation source 14. The second radiation sensing detector 12 is mounted on fixture 24 which is secured to support 26, which fixture can also accommodate mounting thereon a second phase orientation means 36.

The dual-axis radiation sensing detectors 11 and 12 can be dual-axis position sensing photo detectors which can in one form be photoelectric optical sensors such as a dual-axis electronic auto collimator. One example of the auto collimator is the UDT Model 1000 Electronic Autocollimator manufactured by United Detector Technology, Culver City, California. This electronic optical autocollimator comprises a two-axis lateral effect photodiode that can detect the exact position of a spot of projected radiation on its surface. For sensing detector 11 this would be alignment radiation beam 14a and for sensing detector 12 the alignment radiation beam 16a. Well known optics in the form of camera lens are also used as part of the autocollimator, which optics focus the radiation beam onto the photodiode. The photodiode of sensing detector 11 generally depicted at 120 in FIG. 5 has four electrode leads 122, 123, 124 and 125 on the edges of the detector which together provide a first output current signal through lead 18 to readout 48 shown in FIG. 4. Electrode leads 122 and 123 provide a first axis signal, the x'-axis position signal as shown referenced to rectangular coordinates superimposed on the radiation beams in FIG. 3. The x'-axis signal is sent to an electronic amplification circuit depicted in block diagram form at 126, which circuit can be located in readout 48. Amplification circuits for photodiodes are well known in the art and are discussed here only generally. Electrode leads 122 and 123 are connected, appropriately to amplifiers 128 and 129, respectively, which convert the x'-axis position signal output currents to proportional voltages at leads 130 and 132, respectively. Leads 130 and 132 are connected to both a difference and sum amplifier 134 and 136, respectively, such that the difference signal output at lead 138 is proportional to the spot intensity and position of radiation beam 14a, and the sum signal output at lead 140 is proportional only to the spot intensity of radiation beam 14a. An analog divider 142, well known in the art, receives both the difference signal at lead 138 and the sum signal at lead 140 and divides the difference signal by the sum signal to generate the x'-axis position signal at lead 144 which is sent to amplifier 146. The output lead 148 from amplifier 146, carries a voltage representative of the x'-axis position, which is detected and displayed on voltmeter 50 (also shown in FIG. 4 as incorporated in the readout).

Similarly and without detailed discussion, the second axis signal of the dual-axis position sensing photodiode 120 senses the y'-axis position at leads 124 and 125, which signal is sent to difference and summing amplifiers with output signals divided by an analog divider as discussed previously, having its respective output signal amplified and detected for display on voltmeter 54.

The first alignment radiation beam 14a shown in FIG. 3, has superimposed on it (for discussion only), x', y' reference orthogonal coordinate axes. The first dual-axis position sensing detector 11 intercepts alignment radiation beam 14a and through its photodetectors and associated amplification circuitry provides an x'-axis position and y'-axis position of radiation beam 14a relative to the reference (or calibrated) x', y' coordinates shown. Operating similarly, the second dual-axis position sensing detector 12 intercepts the second alignment radiation beam 16a from radiation source 16, and as described for the first dual-axis position sensing detector 11, detector 12 through similar use of photodetectors and associated amplification circuitry provides an x-axis position signal and y-axis position signal detected and displayed on voltmeters 52 and 56, respectively of readout 48. Alignment radiation beam 16a has superimposed on it x, y orthogonal reference (or calibrated) coordinate axes. The x, y and x', y' coordinate axes superimposed on the respective radiation beams can also be alternately physically established at the dual-axis photodetectors of each respective dual-axis position sensing detector 11 and 12. The reference (or calibrated) coordinate axes in this instance being established with respect to a calibration bar to be discussed later.

The first and second dual-axis position sensing detectors 11 and 12 have been described with respect to a dual-axis photodiode and associated optical lenses, as manufactured by United Detector Technology, as example only. The dual-axis detector, however, could also be a dual-axis photo-conductive sensor, photovoltaic sensor, various photodiodes in segmented, quadrant, arrays and other radiation beam detector configurations capable of providing a dual-axis position signal.

The first and second alignment radiation sources 14 and 16 generating the first and second radiation beam 14a and 16a, respectively, can be as example infrared or light emitting diodes, incandescent light with or without associated optical focusing lenses, optical fibers and lasers. Which radiation source used will depend on the radiation sensing detector selected and its specific responsivity, active area and spectral range.

Readout 48 shown in FIG. 4 comprises appropriate electrical circuitry in one form typical to that described in FIG. 5 and position signal detectors and displays in the form of meters 50, 52, 54, and 56 such as voltmeters, a.m. meters or null-meters well known in the art. The x', y' output position signals from detector 11 are connected by lead 18 through circuitry previously discussed to meters 50 and 54, respectively, and the x, y output position signals from detector 12 are connected by lead 20 through similar circuitry to meters 52 and 56, respectively. Meters 50, 52, 54 and 56 have a calibrated alignment (or null) condition indicated in one form as points 58, and meter pointers 50a, 52a, 54a and 56a, respectively, which pointers move + or − with respect to the alignment conditions 58 depending on the respective x', x, y' and y signal received. The reference or calibrated alignment conditions at points 58 together in effect replicate the cross-points of the x', y' and x, y axes. The +or − condition indicates which direction one shaft should be moved with respect to the other to bring them to the alignment conditions. The meters 50, 52, 54 and 56 are scaled so that the amount of movement of their respective pointers from the alignment condition 58 provide information regarding the magnitude of movement or adjustment necessary to bring the shafts into alignment. There also can be associated with each meter a set of pictorial symbols 60, as at meter 54, to symbolically indicated how the driven unit should be adjusted with respect to the driving unit.

The readout 48 is initially calibrated by locking both mount means 30 and 32, with their respective dual-axis sensing structures facing each other, on a calibration bar (not shown) which is simply a round precision ground straight bar. Each mount means is oriented similarly on the calibration bar, as depicted in FIG. 1, a vertical orientation being shown. Each should be oriented similarly, otherwise if angularly out of phase, the resulting alignment will result in the respective axes of the shafts being in parallel alignment, effectively an axial offset, which may be desirable in some instances. However, the great majority of shaft alignment situations require the two shafts to be in axial or rectilinear alignment. To minimize possible paralled alignment and resulting axial offset when not desired, the respective mount means can be accurately oriented (referred to as phase orientation) by the use of two spirit levels 34 and 36. Although a vertical orientation of the shaft alignment apparatus is shown, it must be noted that the alignment apparatus is not limited to a vertical orientation. For example, if both mount means 30 and 32 are rotated 90° from the vertical in the same direction, and the respective spirit levels mounted horizontally on supports 28 and 26, this will again permit accurate phase orientation of the mount means and their respective sensing structures to achieve rectilinear alignment. Accordingly, alignment of shafts 4a and 6a could be achieved by either vertical or horizontal orientation of the two mount means, or for that matter, at any angle around the shaft circumferences as long as the phase orientation used in the calibrated position is replicated.

After the mount means 30 and 32 are phase oriented on the calibration bar, internal nulling circuitry well known in the art (but not shown) can, for example, operate with the respective amplification circuitry shown in FIG. 5, so that the pointers of each meter, such as pointer 50a, can be zeroed in at alignment condition points 58 of the respective meters. Calibration of the alignment apparatus does not have to be done before each shaft alignment job, but should be checked periodically depending on the amount of mechanical use and abuse to the apparatus and with substantial variations in ambient temperature.

Alignment of shafts 4a and 6a is simply accomplished in the following manner with reference to FIGS. 1, 3 and 4. Mount means 30 and 32 with their respective dual-axis position sensing structures are secured, respectively, to each shaft as previously described. The mount means are then phase oriented similarly to the calibration orientation. Leads 18 and 20 are connected to readout 48 to provide x, x', y and y' position signals are acted on by appropriate electrical circuitry previously described, and displayed on meters 50, 52, 54 and 56. The pointers of each meter will move according to the signals received and provide real-time alignment information both in magnitude and direction as to the misalignment condition. A typical display of information is shown in FIG. 4. For simplification, one shaft is chosen as a reference shaft to which the other shaft will be aligned. It is not necessary that a reference shaft be chosen but this greatly simplifies the process since only one driving unit need be shimmed or horizontally adjusted. The unit not chosen as the reference unit is shimmed and horizontally adjusted, according to the misalignment information displayed, until replication of the calibrated alignment conditions 58 is achieved on all four meters. When this occurs, the axes of the two shafts have been rectilinearly positioned to replicate the reference axis of the calibration bar.

The x, y and x', y' position signals can also be used together in combination to determine the angles at which the respective radiation beams are striking the opposite facing sensing structure. This could be useful in situations requiring the two shafts to be aligned within certain angular tolerances as specified by the manufacturer of the coupling used to connect the two shafts.

Figure 6A:
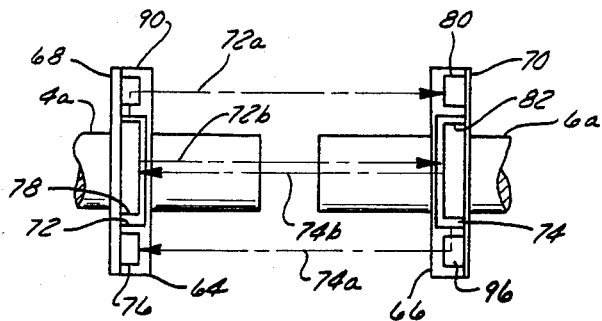
FIG. 6a is a top view of the first variation of the alignment apparatus shown in FIG. 6.
Figure 6:
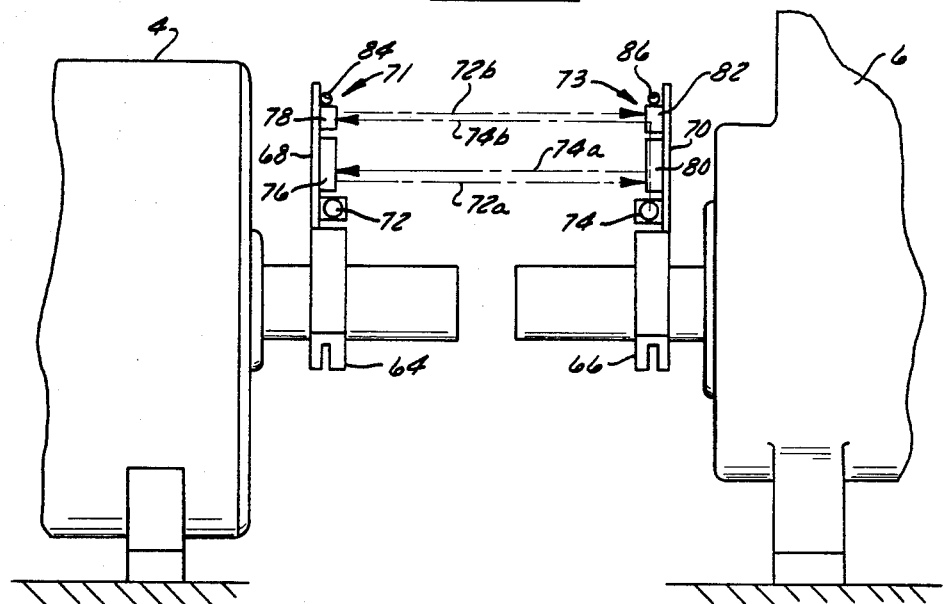
FIG. 6 shows a first variation of the shaft alignment apparatus using single-axis position sensing detectors.
Figure 7:
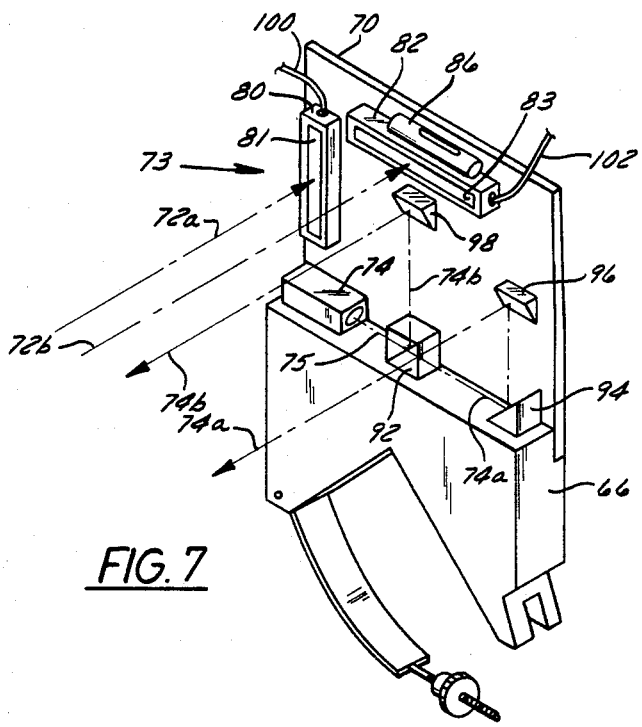
FIG. 7 is a perspective view of the first variation of the alignment apparatus shown in FIG. 6.

FIGS. 6, 6a and 7 show a first variation of the shaft alignment sensing structures. Sensing structures 71 and 73 comprise supports 68 and 70, respectively, each support having mounted thereon dual-axis radiation sensing means in the form of a first single-axis radiation detector 78 and a second single-axis radiation detector 82 (for y, y' coordinate position detection), respectively, and a third single-axis radiation detector 76 and a fourth single-axis radiation detector 80 (for x, x' coordinate position detection), respectively. Also mounted on supports 68 and 70 are radiation sources 72 and 74, respectively, of the type previously described. Each support can also have mounted thereon phase orientation means 84 and 86 in the form of spirit levels also previously discussed. Utilizing two single-axis radiation detectors in lieu of one dual-axis radiation sensing means on each sensing structure, requires two radiation beams for each sensing structure, one each for impinging on each single-axis radiation detector. One way to achieve this is to have each radiation source 72 and 74 comprise two individual radiation sources to provide individual radiation beams. A simpler way is shown in FIGS. 6, 6a and 7, where the radiation sources 72 and 74 are shown as a single radiation source providing two radiation beams, 72a, 72b and 74a, 74b, respectively. This can be accomplished by providing radiation beam splitter means for intercepting the radiation beam, which divides beam 75 from radiation source 74 into two alignment radiation beams. The splitter means can take the form of a cube splitter and reflecting mirrors. Cube splitter 92 which is partially transmissive and partially reflective, generates vertical alignment radiation beam 74a and horizontal alignment radiation beam 74b. The two radiation beams 74a and 74b are oriented and directed to impinge upon the third single-axis radiation detector 76 and the first single-axis radiation detector 78, respectively, which detectors are part of the opposite facing sensing structure 71. Beams 74a and 74b are oriented and directed through the use of reflecting mirrors on prisms 94, 96 and 98, respectively. The mirrors can be mounted appropriately on support 70 to intercept the divided beams. Likewise and with similar radiation beam splitter means, sensing structure 71 orients and directs vertical alignment radiation beam 72a and horizontal alignment radiation beam 72b, to impinge upon the fourth single-axis radiation detector 80 and the second single-axis radiation detector 82, respectively, which detectors are part of the opposite facing sensing structure 73.

The sensing structures 71 and 73 are mounted each, respectively, on shaft mount means 64 and 66 which are similar in structure and operation to the mount means previously described in FIG. 3. In this variation the alignment radiation beams 72a, 72b, 74a and 74b can in one form be laser beams. The single-axis radiation detectors 76, 78, 80 and 82 can be single-axis position sensing photodetectors such as photodiodes, photoconductive sensors, photovoltaic sensors and other radiation beam detector configurations.

Figure 7A:
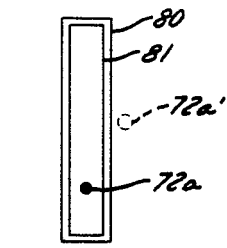
FIG. 7a is a front view of one of the position radiation detectors.

FIG. 7a shows, as example, alignment radiation beam 72a impinging upon the face of single-axis radiation detector 80 having a radiation sensing area 81. The alignment radiation beam 72a is shown as a black dot on area 81 and detector 80 provides an output signal representing the position of beam 72a on this area. The other detectors operate in similar fashion. One limitation of using a single narrow laser beam as shown is that if the two shafts to be aligned are substantially misaligned the projected alignment radiation beam could end up impinging the sensing structure at 72a' and not be sensed by detector 80. If the initial starting conditions of the two shafts are expected to generally have misalignment magnitudes typically greater than the range of the particular detectors used, a second variation of splitter means can be employed as shown in FIG. 8.

FIG. 8 shows the use of a laser for radiation source 74 having mounted on its output a cylindrical lens 77 which deverges the laser beam into a ribbon of laser light 79. The laser ribbon 79 is intercepted by the cube splitter 92 which generates a vertical alignment radiation beam 79b and a horizontal alignment radiation beam 79a. Vertical beam 79b is oriented and directed by mirror 98a to impinge upon position detector 78 and horizontal beam 79a is oriented and directed by mirrors 94a and 96a to impinge upon position detector 76, both detectors on sensing structure 71. Likewise, sensing structure 71 with a laser for radiation source 72 can have a similar cylindrical lens and splitter means to generate a vertical alignment radiation ribbon beam to impinge upon position photodetector 82, and a horizontal alignment radiation ribbon beam 73a to impinge upon position sensing photodetector 80, both detectors on sensing structure 73. In contrast to the spot of radiation projected by narrow beam 72a on detector 80, the ribbon laser beam 73a, shown in FIG. 8a, can move substantially from its central location to positions 73a' and 73a" and still impinge detector 80 to generate a position signal. This permits extending the range of detection to accommodate greater initial starting misalignment conditions of the two shafts.

Figure 7B:
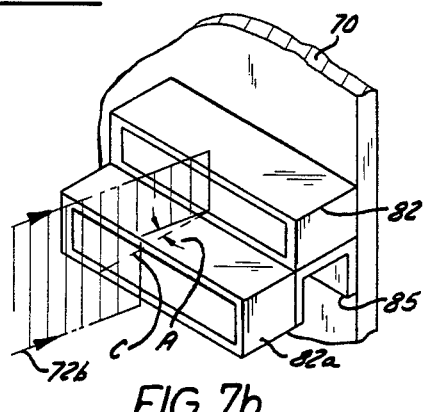
FIG. 7b is a first variation of the single-axis position sensing detector showing its use in pairs to detect angular position.

A variation in using the single-axis position detectors with the radiation ribbons described in FIG. 8 is shown in FIG. 7b. Support 70 is shown in partial section with detector 82 mounted thereon as previously described. Also associated with detector 82 is a second single-axis position detector 82a mounted on the support by a spacer 85 such that detector 82a intercepts radiation beam 72b ahead of detector 82. Spacing the two detectors apart in this manner, such that detector 82 acts as a rear detector and detector 82a acts as a front detector, it is possible to detect the angle A of the radiation beam 72b as defined between the two detector positions, which angle A can be representative of the angular position of sensing structure 71 with respect to sensing structure 73. The two detectors function together in detecting position in one coordinate, such as the x-coordinate, yet provide a combined output signal representative of the angular position of radiation beam with respect to that particular coordinate. This angular position can be electronically compared to the calibrated angular condition such as at position C in FIG. 7b, and accordingly provide shaft misalignment information in the angular mode. Likewise, position detectors 76,78 and 80 can each have associated with them a second detector mounted in front to similarly detect for their respective coordinates the angles of radiation beams 74a, 74b and 72a, respectively.

FIG. 9 shows one form of electrical circuit to process the signal from any one of the single-axis position photodetectors 76, 78, 80 and 82 for display on one of the meters of readout 48. The photodetectors can, in one form, be position sensing photodiodes of the Series LSC type, manufactured by United Detector Technology. Photodetector 80, shown in FIG. 9 as one of the position sensing photodiodes, has three pins 83a, 83b and 83c to which are connected leads 101, 106, 110, respectively. Lead 101 is connected to a load resistor R1 having its other end connected to lead 103. Lead 106 is connected to the negative side of a voltage source $V_1$, to provide a back voltage bias, and the positive side of $V_1$ is connected by lead 104 to load resistor $R_2$ having its other end connected to lead 103. Lead 110 is connected to a trimming or nulling resistor R4 having its other end connected by lead 108 to load resistor R3. The resistor R3 has its other end connected to lead 103. Positional reading of the radiation beam impinging on the active surface 81 of detector 80 is picked off leads 105 and 107 by a voltmeter, such as meter 56. Leads 105 and 107 are connected to leads 101 and 110, respectively. In essence, the photodetector 80 operates on the principle that when the radiation beam impinges exactly at the center of the detector active area, no electrical signal is generated (the null, zero or alignment condition). However, any movement or placement of the radiation beam from the center will generate a continuous electrical signal proportional to the exact distance of the radiation beam from the center. In operation, during the calibration process as previously described, the four alignment radiation beams will be directed to their respective opposite facing photodetectors. Signals from these detectors sensed at readout 48 can then be nulled by adjusting resistor R4 of each photodetector circuit such that the respective pointer of each meter will be positioned at the alignment conditions 58. Placement of the sensing structures, one each on the two shafts to be aligned, will again direct the alignment radiation beams in the direction of their respective detectors and any deviation of the radiation beams from the center or null position on each detector will be displayed proportionally in magnitude and direction. These readings will be representative of the magnitude and direction of misalignment of the axis of the two shafts as compared to the axis of the calibration bar.

With reference to FIGS. 1 thru 8 and the description of the sensing structures and shaft mount means, the method of statically aligning a first shaft with a second shaft, wherein the first shaft has mounted thereon a first dual-axis radiation sensing means and a first radiation source providing a first radiation beam and the second shaft has mounted thereon a second dual-axis radiation sensing means and a second radiation source providing a second radiation beam, and readout means having defined alignment conditions, comprises the steps of: orienting the first radiation beam to the second dual-axis radiation sensing means and generating a second signal representing the orientation of the first beam; orienting the second radiation beam to the first dual-axis radiation sensing means and generating a first signal representing the orientation of the second radiation beam; sensing the first and second signals at the readout means and visually displaying the orientation of the first and second radiation beams; and adjusting the first shaft with respect to the second shaft until the first signal and the second signal are replicating the defined alignment conditions on the readout means. If the first dual-axis radiation sensing means is comprised of a first single-axis position sensing photodetector and a third single-axis position sensing photodetector, and the second dual-axis radiation sensing means is comprised of a second single-axis position sensing photodetector and a fourth single-axis position photodetector, then the method of static alignment just mentioned will further include the steps of: providing or positioning a first radiation beam splitter means intercepting the first radiation beam and generating a first vertical alignment radiation beam directed to impinge upon the second single-axis position sensing photodetector and a first horizontal alignment radiation beam directed to impinge upon the fourth single-axis sensing photodetector; and providing a second radiation beam splitter means intercepting the second radiation beam and generating a second vertical alignment radiation beam directed to impinge upon the first single-axis position sensing photodetector and a second horizontal alignment radiation beam directed to impinge upon the third single-axis position sensing photodetector. When parallel offset is desired to be avoided, the method above can further include the steps of: providing a first phase orientation means for orienting the first dual-axis radiation sensing means and first radiation source; and providing a second phase orientation means for orienting the second dual-axis radiation sensing means and second radiation source.

Another object of the shaft alignment sensing structure of the present invention is in its use for monitoring changes in alignment of two coupled shafts during their operation. FIG. 10 shows such an arrangement. The apparatus for monitoring the alignment of the driving unit 4 having driving shaft 4a coupled by coupling 7 to driven unit 6 having driven shaft 6a, comprises: the first support 28 mounted on the driving unit and carrying the first dual-axis radiation sensing structure 9, and the second support 26 mounted on the driven unit and carrying the second dual-axis radiation sensing structure 10. The sensing structures 9 and 10 are as described in FIGS. 1, 2 and 3 or their variations as described in FIGS. 6, 6a, 7 and 8. As described previously in these Figures, the first support carries a first means in the form of a radiation source for providing a first alignment radiation beam oriented to impinge upon the second dual-axis radiation detector to generate a second signal at lead 20, and the second support carries a second means in the form of a radiation source for providing a second alignment radiation beam oriented to impinge upon the first dual-axis radiation detector to generate a first signal at lead 18, with the first and second signals being connected to readout 48. The first support can also have first means for phase orienting the first support on the driving unit and the second support can have second means for phase orienting the second support on the driven unit. The method of monitoring operating changes in the alignment of the driving unit shaft with respect to the driven unit shaft comprises the steps of: sensing the position of the first alignment radiation beam on the second dual-axis radiation sensing means and generating the second signal representing the position of the first beam; sensing the position of the second alignment radiation beam on the first dual-axis radiation sensing means and generating a first signal representing the position of the second beam; send the first and second signals to the readout for visual display; and calibrating the first and second signals to coincide with the defined alignment conditions on the readout. The first and second signals on the readout will accordingly monitor operating changes in the alignment of the driving and driven unit shafts. In essence, once the sensing structures are mounted on the units to be monitored, their respective signals can then be nulled out on the meters of readout 48 at the alignment conditions 58 to establish reference alignment conditions. Upon activation of the two units to normal operating condition, any change in the alignment between the two shafts will be detected by the sensing structures and the magnitude and direction of this misalignment from the reference alignment conditions will be continually displayed at the readout.

While I have shown and described the preferred embodiments, various modifications and changes to the structures and their mode of operation may be made by those skilled in the art without departing from the true spirit and scope of the invention as defined in the accompanying claims.

I claim:

1. A shaft alignment apparatus for statically aligning a first shaft with a second shaft, comprising:
    a first dual-axis position sensing detector providing a first signal;
    a second dual-axis position sensing detector providing a second signal;
    first mount means for mounting the first dual-axis position sensing detector to the first shaft;
    second mount means for mounting the second dual-axis position sensing detector to the second shaft;
    a first alignment radiation source mounted on the first mount means and oriented to provide a first alignment radiation beam to the second dual-axis position sensing detector to generate the second signal;
    a second alignment radiation source mounted on the second mount means and oriented to provide a second alignment radiation beam to the first dual-axis position sensing detector to generate the first signal; and
    a readout means having defined alignment conditions and being responsive to the first signal and the second signal for visually displaying shaft alignment, whereby with adjustment of the first shaft with respect to the second shaft, alignment of the first shaft with the second shaft will be indicated on the readout means according to the defined alignment conditions.

2. A shaft aligning apparatus as recited in claim 1 wherein the first dual-axis position sensing detector is a first dual-axis position photodetector and the second dual-axis position sensing detector is a second dual-axis position photodetector.

3. A shaft alignment apparatus as recited in claim 2 wherein the first dual-axis position photodetector is a first electronic optical autocollimator, and the second dual-axis position photodetector is a second electronic optical autocollimator.

4. A shaft alignment apparatus as recited in claim 2 further including a first phase orientation means mounted on the first mount means and a second phase orientation means mounted on the second mount means.

5. A shaft alignment apparatus as recited in claim 4 wherein the first phase orientation means is a first spirit level and the second phase orientation means is a second spirit level.

6. A shaft alignment apparatus as recited in claim 2 wherein the first alignment radiation source is a first laser and the second alignment radiation source is a second laser.

7. A shaft alignment apparatus as recited in claim 2 wherein the first dual-axis position photodetector comprises a first single-axis position sensing photodetector and a third single-axis position sensing photodetector, and the second dual-axis position photodetector comprises a second single-axis position sensing photodetector and a fourth single-axis position sensing photodetector.

8. A shaft alignment apparatus as recited in claim 7 wherein the readout means is selectively responsive to the first single-axis position sensing photodetector, second single-axis position sensing photodetector, third single-axis position sensing photodetector and fourth single-axis position sensing photodetector.

9. A shaft alignment apparatus as recited in claim 8 wherein the first alignment radiation source comprises a first laser providing the first alignment radiation beam and a first radiation beam splitter means for intercepting the first alignment radiation beam and generating a first vertical alignment radiation beam oriented to intercept the second single-axis position sensing photodetector and a first horizontal alignment radiation beam oriented to intercept the fourth single-axis position sensing photodetector, and the second alignment radiation source comprises a second laser providing the second alignment radiation beam and a second radiation beam splitter means for intercepting the second alignment radiation beam and generating a second vertical alignment radiation beam oriented to intercept the first single-axis position sensing photodetector and a second horizontal alignment radiation beam oriented to intercept the third single-axis position sensing photodetector.

10. A shaft alignment apparatus as recited in claim 2 wherein the first dual-axis position photodetector comprises:
    a first-front single-axis position sensing photodetector and a first rear single-axis position sensing photodetector, and a third front single-axis position sensing photodetector and a third rear single-axis position sensing photodetector,
and wherein the second dual-axis position photodetector comprises:
    a second front single-axis position sensing photodetector and a second rear single-axis position sensing photodetector, and a fourth front single-axis position sensing photodetector and a fourth rear single-axis position sensing photodetector.

11. A shaft alignment apparatus for aligning a first shaft with a second shaft, comprising:
    first mount means carrying a first dual-axis radiation sensing means, the first mount means mounted on the first shaft;
    second mount means carrying a second dual-axis radiation sensing means, the second mount means mounted on the second shaft;
    first radiation means for providing a first radiation beam, the first radiation means carried on the first mount means and oriented to project the first radiation beam to the second dual-axis radiation sensing means and generate a second signal;

a second radiation means for providing a second radiation beam, the second radiation means carried on the second mount means and oriented to project the second radiation beam to the first dual-axis radiation sensing means and generate a first signal; and readout means having defined alignment conditions and being responsive to the first signal and the second signal for visually displaying shaft alignment, whereby with adjustment of the first shaft with respect to the second shaft, alignment of the first shaft with the second shaft will be indicated by the readout means when the first signal and the second signal coincide with the defined alignment conditions.

12. A shaft alignment apparatus as recited in claim 11 wherein the first dual-axis radiation sensing means is a first dual-axis photodetector and the second dual-axis radiation sensing means is a second dual-axis photodetector.

13. A shaft alignment apparatus as recited in claim 12 wherein the first dual-axis photodetector comprises a first single-axis position photodetector and a third single-axis position photodetector, and the second dual-axis photodetector comprises a second single-axis position photodetector and a fourth single-axis position photodetector.

14. A shaft alignment apparatus as recited in claim 13 wherein the first radiation means is a first laser and the second radiation means is a second laser.

15. A shaft alignment apparatus as recited in claim 14 further including first means for intercepting the first radiation beam and generating a first vertical alignment radiation beam oriented to impinge upon the second single-axis position photodetector and a first horizontal alignment radiation beam oriented to impinge upon the fourth single-axis position photodetector, and second means for intercepting the second radiation beam and generating a second vertical alignment radiation beam oriented to impinge upon the first single-axis position photodetector and a second horizontal alignment radiation beam oriented to impinge upon the third single-axis position photodetector.

16. A shaft alignment apparatus as recited in claim 12 wherein the first dual-axis photodetector comprises:
a first front single-axis position sensing photodetector and a first rear single-axis position sensing photodetector, and a third front single-axis position sensing photodetector and a third rear single-axis position sensing photodetector,
and wherein the second dual-axis photodetector comprises:
a second front single-axis position sensing photodetector and second rear single-axis position sensing photodetector, and a fourth front singl-axis position sensing photodetector and a fourth rear single-axis position sensing photodetector.

17. A shaft alignment apparatus as recited in claim 12 further including a first phase orientation means mounted on the first mount means and a second phase orientation means mounted on the second mount means.

18. Static shaft alignment apparatus, comprising:
a first dual-axis radiation sensing means mounted on a first mount means;
a second dual-axis radiation sensing means mounted on a second mount means;
a first radiation source carried on the first mount means and oriented to provide a first radiation beam to the second dual-axis radiation sensing means to generate a second signal;

a second radiation source carried on the second mount means and oriented to provide a second radiation beam to the first dual-axis radiation sensing means to generate a first signal; and readout means having defined alignment conditions and being responsive to the first signal and second signal for visually displaying alignment.

19. Static shaft alignment apparatus as recited in claim 18 wherein the first dual-axis radiation sensing means is a first dual-axis position photodetector and the second dual-axis radiation sensing means is a second dual-axis position photodetector.

20. Static shaft alignment apparatus as recited in claim 19 wherein the first dual-axis position photodetector is a first dual-axis electronic optical autocollimator, and the second dual-axis position photodetector is a second dual-axis electronic optical autocollimator.

21. Static shaft alignment apparatus as recited in claim 19 further including a first phase orientation means mounted on the first mount means and a second phase orientation means mounted on the second mount means.

22. Static shaft alignment apparatus as recited in claim 19 wherein the first dual-axis position photodetector comprises a first single-axis position photodetector and a third single-axis position photodetector, and the second dual-axis position photodetector, comprises a second single-axis position photodetector and a fourth single-axis position photodetector.

23. Static shaft alignment apparatus as recited in claim 22 wherein the first radiation source is a first laser and the second radiation source is a second laser.

24. Static shaft alignment apparatus as recited in claim 23 further including a first radiation beam splitter means for intercepting the first radiation beam and generating a first vertical alignment radiation beam oriented to impinge upon the second single-axis position photodetector and a first horizontal alignment radiation beam oriented to impinge upon the fourth single-axis position photodetector, and a second radiation beam splitter means for intercepting the second radiation beam and generating a second vertical alignment radiation beam oriented to impinge upon the first single-axis position photodetector and a second horizontal alignment radiation beam oriented to impinge upon the third single-axis position photodetector.

25. Static shaft alignment apparatus as recited in claim 19 wherein the first dual-axis position photodetector comprises:
a first front single-axis position sensing photodetector and a first rear single-axis position sensing photodetector, and a third front single-axis position sensing photodetector and a third rear single-axis position sensing photodetector,
and wherein the second dual-axis position photodetector comprises:
a second front single-axis position sensing photodetector and a second rear single-axis position sensing photodetector, and a fourth front single-axis position sensing photodetector and a fourth rear single-axis position sensing photodetector.

26. A method of statically aligning a first shaft with a second shaft, wherein the first shaft has mounted thereon a first dual-axis radiation sensing means and a first radiation source providing a first radiation beam and the second shaft has mounted thereon a second dual-axis radiation sensing means and a second radiation source providing a second radiation beam, and readout means having defined alignment conditions, comprising the steps of:

orienting the first radiation beam to the second dual-axis radiation sensing means and generating a second signal representing the orientation of the first radiation beam;

orienting the second radiation beam to the first dual-axis radiation sensing means and generating a first signal representing the orientation of the second radiation beam;

sensing the first signal and second signal at the readout means and visually displaying the orientation of the first radiation beam and the second radiation beam; and adjusting the first shaft with respect to the second shaft until the first signal and the second signal are replicating the defined alignment conditions on the readout means.

27. The invention according to claim 26 wherein the first radiation sensing means is a first dual-axis position sensing photodetector and the second radiation sensing means is a second dual-axis position sensing photodetector.

28. The invention according to claim 27 wherein the first dual-axis position sensing photodetector is a first dual-axis electronic optical autocollimator and the second dual-axis position sensing photodetector is a second dual-axis electronic optical autocollimator.

29. The invention according to claim 27 wherein the first dual-axis position sensing photodetector comprises a first single-axis position photodetector and a third single-axis position photodetector, and the second dual-axis position sensing photodetector comprises a second single-axis position photodetector and a fourth single-axis position photodetector.

30. The invention according to claim 29 wherein the first radiation source is a first laser and the second radiation source is a second laser, the further steps of:

providing a first radiation beam splitter means intercepting the first radiation beam and generating a first vertical alignment radiation beam directed to impinge upon the second single-axis position photodetector and a first horizontal alignment radiation beam directed to impinge upon the fourth single-axis position photodetector; and providing a second radiation beam splitter means intercepting the second radiation beam and generating a second vertical alignment radiation beam directed to imping upon the first single-axis position photodetector and a second horizontal alignment radiation beam directed to impinge upon the third single-axis position photodetector.

31. The invention according to claim 27 further including the steps of:

providing a first phase orientation means for orienting the first dual-axis radiation sensing means and first radiation source on the first shaft; and providing a second phase orientation means for orienting the second dual-axis radiation sensing means and second radiation source on the second shaft.

32. A method of statically aligning a first shaft with a second shaft, wherein the first shaft has mounted thereon a first dual-axis radiation sensing means and first radiation source providing a first radiation beam and the second shaft has mounted thereon a second dual-axis radiation sensing means and a second radiation source providing a second radiation beam, and readout means having defined alignment conditions, comprising the steps of:

sensing the position of the first radiation beam on the second dual-axis radiation sensing means and generating a second signal representing the position of the first radiation beam;

sensing the position of the second radiation beam on the first dual-axis radiation sensing means and generating a first signal representing the position of the second radiation beam; and replicating the defined alignment conditions on the readout means by adjusting the first shaft with respect to the second shaft until the first signal and second signal coincide with the defined alignment conditions.

33. The invention according to claim 32 wherein the first radiation sensing means is a first dual-axis position sensing photodetector and the second radiation sensing means is a second dual-axis position sensing photodetector.

34. The invention according to claim 32 further including the steps of:

providing a first phase orientation means for orienting the first dual-axis position sensing photodetector and first radiation source on the first shaft and;

providing a second phase orientation means for orienting the second dual-axis position sensing photodetector and second radiation source of the second shaft.

35. The invention according to claim 34 wherein the first dual-axis position sensing photodetector a first single-axis position photodetector and a third position photodetector, and the second dual-axis position sensing photodetector comprises a second single-axis position photodetector and a fourth single-axis position photodetector.

36. The invention according to claim 35 wherein the first radiation source is a first laser and the second radiation source is a second laser, the further steps of:

positioning a first radiation beam splitter means intercepting the first radiation beam and directing a first vertical alignment radiation beam to impinge upon the second single-axis position photodetector and a first horizontal alignment radiation beam to impinge upon the fourth single-axis position photodetector; and positioning a second radiation beam splitter means intercepting the second radiation beam and directing a second vertical alignment radiation beam to impinge upon the first single-axis position photodetector and a second horizontal alignment radiation beam to impinge upon the third single-axis position photodetector.

37. Apparatus for monitoring the alignment of a driving unit having a driving shaft and a driven unit having a driven shaft, the driving shaft and the driven shaft interconnected by a coupling, comprising:

a first support mounted on the driving unit, the first support carrying a first dual radiation sensing means;

a second support mounted on the driven unit, the second support carrying a second dual-axis radiation sensing means;

first means carried on the first support for providing a first alignment radiation beam oriented to impinge upon the second dual-axis radiation sensing means and a generate a second signal;

second means carried on the second support for providing a second alignment radiation beam oriented to impinge upon the first dual-axis radiation sensing means and generate a first signal; and readout means having defined alignment conditions and being responsive to the first signal and the second signal for visually displaying the alignment of the driving shaft with respect to the driven shaft.

38. The invention according to claim 37 wherein the first dual-axis radiation sensing means is a first dual-axis position sensing photodetector and the second dual-axis radiation sensing means is a second dual-axis position sensing photodetector.

39. The invention according to claim 38 wherein the first dual-axis position sensing photodetector is a first dual-axis electronic optical autocollimator and the second dual-axis position sensing photodetector is a second dual-axis electronic optical autocollimator.

40. The invention according to claim 38 wherein the first dual-axis position sensing photodetector comprises a first single-axis position photodetector and a third single-axis position photodetector, and the second dual-axis position sensing photodetector comprises a second single-axis position photodetector and a fourth single-axis position photodetector.

41. The invention according to claim 40 further including first means for intercepting the first alignment radiation beam and generating a first vertical radiation beam directed to impinge upon the second single-axis position sensing photodetector and a first horizontal radiation beam directed to impinge upon the fourth single-axis position sensing photodetector, and second means for intercepting the second alignment radiation beam and generating a second vertical radiation beam directed to impinge upon the first single-axis position sensing photodetector and a second horizontal radiation beam directed to impinge upon the third single-axis position sensing photodetector.

42. The invention according to claim 37 further including first means for phase orienting the first support on the driving unit and second means for phase orienting the second support on the driven unit.

43. The invention according to claim 42 wherein the first means for orienting the first support is a first spirit level and the second means for orienting the second support is a second spirit level.

44. The invention according to claim 37 wherein the first means for providing a first alignment radiation beam is a first laser and the second means for providing a second alignment radiation beam is a second laser.

45. A method of monitoring operating changes in the alignment of a driving unit having a driving shaft and a driven unit having a driven shaft, the driving shaft and driven shaft interconnected by a coupling, wherein the driving unit has mounted thereon a first dual-axis radiation sensing means and means for providing a first alignment radiation beam, and the driven unit has mounted thereon a second dual-axis radiation sensing means and means for providing a second alignment radiation beam, and readout means having defined alignment conditions, comprising the steps of:

sensing the position of the first alignment radiation beam on the second dual-axis radiation sensing means and generating a second signal representing the position of the first alignment radiation beam;

sensing the position of the second alignment radiation beam on the first dual-axis radiation sensing means and generating a first signal representing the position of the second alignment radiation beam;

sending the first signal and the second signal to the readout means for visual display; and calibrating the first and second signals to coincide with the defined alignment conditions, whereby the first and second signals will monitor operating changes in the alignment of the driving unit with respect to the driven unit as compared to the defined alignment conditions.

* * * * *